United States Patent Office 3,101,254
Patented Aug. 20, 1963

3,101,254
PRODUCTION OF SILICA FREE HYDROGEN FLUORIDE
George L. Cunningham, Allentown, Pa., assignor to W. R. Grace & Co., New York, N.Y., a corporation of Connecticut
No Drawing. Filed Mar. 16, 1961, Ser. No. 96,086
2 Claims. (Cl. 23—153)

This invention relates to a process for recovering fluorine values from fluosilicic acid. In one aspect, it is concerned with the production of silica-free hydrogen fluoride.

In conventional methods of production of hydrogen flouride in which fluorspar is treated with sulfuric acid, the hydrogen fluoride exit gases contain varying amounts of inert contaminants such as carbon dioxide and air, relatively small amounts of water vapor and sulfur dioxide and rather substantial amounts of silicon tetrafluoride derived from silica impurities in the fluorspar. In the production of commercial hydrogen fluoride, removal of fluorosilicic acid from the system has presented difficult operating problems. A number of processes have been devised for the purification of hydrogen fluoride. However, these are relatively difficult and complicated. Also, they result in the production of a relatively large proportion of the hydrogen fluoride as even more polluted hydrogen fluoride.

The invention relates to a cyclic process in which an alkali metal fluoride and ammonium bifluoride react to form alkali metal bifluoride and ammonium fluoride, whereupon the alkali metal bifluoride is decomposed into hydrogen fluoride and alkali metal fluoride while the ammonium fluoride is converted, with fluosilicic acid, to ammonium bifluoride. The ammonium bifluoride and alkali metal fluoride are then recycled to form more hydrogen fluoride.

The principal object of the invention is the provision of a simply controlled process for the producton of alkali metal bifluorides and the subsequent conversion of these bifluorides into silica-free hydrogen fluoride. A further object is the production of alkali metal bifluorides from ammonium fluoride or from silicon tetrafluoride.

The invention is based on the discovery that an alkali metal fluoride will react with ammonium bifluoride in aqueous solution at room temperature to give a high yield of alkali metal bifluoride which can be converted to silica-free hydrogen fluoride. Also formed in the reaction is ammonium fluoride which, in high concentration, causes the precipitation of the alkali metal bifluoride. The alkali metal bifluoride can then be separated from the ammonium fluoride in solution by filtration. It may be then decomposed into alkali metal fluoride and silica-free hydrogen fluoride by heating to 300°–450° C. The hydrogen fluoride is evolved as a gas and the alkali metal fluoride is reacted with additional ammonium acid fluoride. The filtrate of ammonium fluoride from the initial step is converted into ammonium bifluoride by evaporation of the solution to dryness, followed by heating the solid to evolve ammonia and ammonium bifluoride. The latter is recycled to the initial step. The ammonia evolved is trapped in an aqueous solution of fluorsilicic acid, whereupon it reacts to form silicon dioxide, a filterable solid, and ammonium fluoride in solution. This ammonium fluoride is added to the aforementioned filtrate of same. The entire foregoing process for sodium bifluoride can be represented graphically as follows:

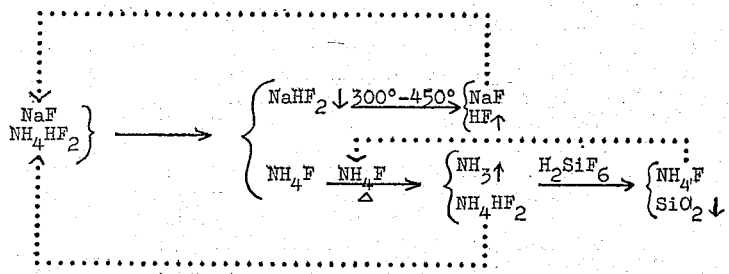

In this process substantially all of the fluorine in the fluosilicic acid is converted into high purity hydrogen fluoride without the production of any polluted hydrogen fluoride. Also, the alkali metal bifluoride from the initial reaction is quite pure and as such, is a saleable product if preferred over the hydrogen fluoride.

The ammonium bifluoride can be produced by reacting ammonium fluoride with fluorosilicic acid. As well, additional ammonium fluoride is prepared from silicon tetrafluoride. In this process, the den gases from the treatment of phosphate rock with sulfuric acid are absorbed in water, and ammonia is added to the resulting solution cotnaining fluosilicic acid. Hydrated silica which precipitates is separated from the solution containing ammonium fluoride.

The following examples are given for the purpose of illustrating the invention and not intended to limit the scope of the invention:

*Example I*

58.1 grams of KF were added to a solution composed of 57.1 grams of $NH_4HF_2$, 8.03 grams $KHF_2$, and 100 grams of water. The slurry was stirred for two hours at 25° C. and filtered to remove $KHF_2$. The filtrate was evaporated to remove 53.2 grams of water. The slurry was cooled to 25° C. and stirred for two hours. It was filtered to remove $KHF_2$. A total of 78.1 grams of $KHF_2$ were obtained. The filtrate was composed of 37.04 grams of $NH_4F$, 8.03 grams of $KHF_2$ and 46.8 grams of water. A solution composed of 37.04 grams of $NH_4F$ and 90 grams of water was added to the filtrate and the combined solution was evaporated to dryness. The resulting solid was heated to 170° C. for two hours. Ammonia gas was evolved, and this was used to react with fluosilicic acid to produce ammonium fluoride. A solid was obtained which was composed of 57.1 grams of $NH_4HF_2$ and 8.03 grams of $KHF_2$. This solid was used again in the next cycle. The $KHF_2$ obtained was heated to 450° C. to produce 20 grams of silica-free HF, and 58.1 grams of KF. The potassium fluoride was used again in the next cycle.

*Example II*

32.5 grams of $NH_4HF_2$ were added to a solution composed of 18.06 grams of NaF and 100 grams of water. The slurry was stirred for two hours at 25° C. and filtered to remove $NaHF_2$. The mother liquor was evaporated to remove 79.1 grams of water. The slurry was cooled to 25° C., stirred for two hours at 25° C. and filtered to remove solid $NaHF_2$. A total of 26.47 grams of $NaHF_2$ was obtained. This is a yield of 99.29% based on the sodium fluoride used. The mother liquor was composed of 16.45 grams $NH_4F$, 7.33 grams $NH_4HF_2$, 0.17 gram of NaF and 20.88 grams of water, 16.33 grams of $NH_4F$ were added to the solution, and the solution was evaporated to dryness. The dry product was heated to 170° C. for two hours, to produce 32.5 grams of $NH_4HF_2$ which was used in the next cycle. The $NaHF_2$ obtained was heated to 350° C. to obtain 18.1 grams of NaF and 8.1 grams of silica-free HF. The sodium fluoride was used again in the next cycle.

I claim:

1. In production of substantially pure hydrogen fluoride the steps of: combining alkali metal fluoride and ammonium bifluoride in aqueous solution, stirring for two hours at 25° C., filtering to remove alkali metal bifluoride as a solid from the solution, evaporating the filtrate to concentrate it with respect to alkali metal bifluoride, cooling to 25° for the purpose of crystallizing additional alkali metal bifluoride, stirring for two hours at 25° C., filtering to remove alkali metal bifluoride as a solid from the solution, evaporating the filtrate to concentrate it with respect to alkali metal bifluoride, cooling to 25° for the purpose of crystallizing additional alkali metal bifluoride, stirring for two hours, filtering to remove alkali metal bifluoride as a solid, heating said alkali metal bifluoride to 300–450°, thereby liberating silica-free hydrogen fluoride and recovering said hydrogen fluoride as a gas.

2. In production of substantially pure hydrogen fluoride from fluosilicic acid the steps of: combining alkali metal fluoride and ammonium bifluoride in aqueous solution, stirring for two hours at 25° C., filtering to remove alkali metal bifluoride as a solid from the ammonium fluoride solution, evaporating the filtrate to concentrate it with respect to alkali metal bifluoride, cooling to 25° for the purpose of crystallizing additional alkali metal bifluoride, stirring for two hours, filtering to remove alkali metal bifluoride as a solid, heating said alkali metal bifluoride to 300°–450°, thereby liberating silica-free hydrogen fluoride, recycling the solid residue of alkali metal fluoride back to the initial step, adding to the aforementioned filtrate of ammonium fluoride a second quantity of ammonium fluoride produced as described below, heating to drive off ammonia from the remaining solution of ammonium bifluoride, recycling said ammonium bifluoride back to the initial step, trapping said ammonia in a solution of fluosilicic acid from the acidulation of phosphate rock and allowing it to react with same, thereby producing silicon dioxide which can be filtered off and discarded and ammonium fluoride in aqueous solution which is recycled as indicated above.

References Cited in the file of this patent

UNITED STATES PATENTS

| | | |
|---|---|---|
| 1,426,890 | McClenahan | Aug. 22, 1922 |
| 1,911,004 | Svendsen | May 23, 1933 |
| 2,588,786 | Winter | Mar. 11, 1952 |
| 2,880,060 | Campbell et al. | Mar. 31, 1959 |
| 2,981,601 | Kidde | Apr. 25, 1961 |
| 3,005,684 | Reidl | Oct. 24, 1961 |

FOREIGN PATENTS

| | | |
|---|---|---|
| 1,010,504 | Germany | June 19, 1957 |